United States Patent Office 3,492,089
Patented Jan. 27, 1970

3,492,089
CRYSTALLINE ALUMINOSILICATE FAUJASITE MANUFACTURE
Kenneth D. Vesely, Arlington Heights, Ill., assignor to Universal Oil Products Company, Des Plaines, Ill., a corporation of Delaware
No Drawing. Continuation-in-part of application Ser. No. 529,674, Feb. 24, 1966. This application Nov. 26, 1968, Ser. No. 779,222
Int. Cl. C01b 33/26
U.S. Cl. 23—112
7 Claims

ABSTRACT OF THE DISCLOSURE

The formation of crystalline aluminosilicate faujasite from a mixture comprising solid silica particles and sodium aluminate by adding a quantity of sodium silicate to the mixture and heating the resultant mixture under elevated temperature and pressure conditions to effect conversion of the solid silica to a faujasite.

CROSS-REFERENCE TO RELATED APPLICATION

This application is a continuation-in-part of copending application, Ser. No. 529,674, filed Feb. 24, 1966, now abandoned, all the teachings of said copending application are incorporated herein by specific reference thereto.

BACKGROUND OF THE INVENTION

Field of the invention

This invention relates to a method for the manufacture of a crystalline aluminosilicate faujasite from solid silica particles. More particularly, this invention relates to faujasite manufacture by addition of a quantity of sodium silicate to a solid-liquid mixture comprising solid silica particles and sodium aluminate, aging the resultant mixture and then heating the mixture under superatmospheric pressure to effect conversion of a substantial portion of the solid silica particles to crystalline aluminosilicate faujasite.

DESCRIPTION OF THE PRIOR ART

There are a number of ways in which crystalline aluminosilicates may be formed. One common way is to mix aqueous solutions of sodium silicate and sodium aluminate with or without excess sodium hydroxide and allow these solutions to react and form a solid crystalline aluminosilicate. Another method is to contact a solid inorganic oxide selected from the group consisting of silica, alumina, and mixtures thereof with an aqueous treating solution containing alkali metal cations (preferably sodium) and anions selected from the group consisting of hydroxyl, silicate and aluminate and allow the solid-liquid mixture to react until the desired crystalline aluminosilicate has formed. A third method is to contact certain clays or other materials containing silica and alumina with a basic material, preferably sodium hydroxide, under conditions to effect the crystallization of the aluminosilicate. In all of these methods, the conditions under which crystallization occurs is atmospheric pressure and temperatures below usually 212° F. although sometimes temperatures as high as about 250° F. have been taught.

I have unexpectedly found that when faujasite production is attempted using solid silica particles as a major source while employing the high temperature high pressure conversion conditions of the process of this invention that a quantity of an aqueous silicate is required to be in solution with aqueous aluminate solution in order to convert the solid silica particles to faujasite. In closely controlled experiments in which solid silica particles were contacted with an aqueous solution containing sodium aluminate and sodium hydroxide with the mixture heated at superatmospheric presure to a temperature between about 265° F. and about 325° F. when a portion of sodium silicate was added to the solid-liquid mixture prior to heating substantially all of the solid silica particles were converted to faujasite. In the experiment in which no aqueous sodium silicate was added to the solid-liquid mixture prior to heating, there was no conversion of the solid silica spheres to faujasite.

In employing the required sodium silicate addition to a solid-liquid mixture comprising solid silica spheres, sodium aluminate and sodium hydroxide, with high pressure, high temperature silica conversion the time for conversion of the solid silica to faujasite is considerably reduced and thus for a given amount of equipment, a larger quantity of crystalline aluminosilicate faujasite per unit time can be produced. The effect is very important in the formation of crystalline aluminosilicates such as faujasite since the prior art methods require long periods of aging to effect proper crystallization. Another advantage of my invention is that better utilization of the reactants is attained, that is, from a given amount of raw materials, a higher yield of crystlline aluminosilicate is obtained. This is due to the high temperatures and pressures employed during crystal formation. It has been found, for example, that the spent solution (the solution from which the crystallized faujasite is removed) contains a low amount of silicon and aluminum containing compounds. This means that more of the silica and alumina ends up in the crystallized faujasite.

SUMMARY OF THE INVENTION

It is an object of my invention to convert solid silica particles present in a solid-liquid mixture containing an aqueous solution comprising sodium aluminate and sodium hydroxide to a faujasite by adding a quantity of an aqueous sodium silicate solution to the mixture and then heating said solid-liquid mixture under superatmospheric pressure to form crystalline aluminosilicate faujasite.

It is another object of this invention to employ temeratures above the normal boiling point of water during the high temperature high pressure conversion step.

Faujasite is a crystalline aluminosilicate having a rigid structure of silicon centered or aluminum centered tetrahedra (oxygen atoms being present on the four ends of the tetrahedra) forming a structure of small cavities connected by still smaller pore entrances. These pore entrances are of uniform size, said size being between 6 and 15 angstrom units and probably from about 8 to about 11 angstrom units. These pore entrances are sufficiently large to allow the passage of most hydrocarbons such as paraffins, most monocyclic naphthenes, most monocyclic aromatics, etc., therethrough. This particular aluminosilicate is accordingly highly advantageous as a catalyst support in many hydrocarbon conversion reactions. Usually, the synthetic form of faujasite is prepared in the sodium form, that is, the aluminum centered tetrahedra having an electric charge of minus 1 has a sodium cation associated with it having a charge of plus 1 which makes this tetrahedra neutral. In this form, faujasite has very little catalytic activity. However, when the sodium cations are exchanged with divalent cations such as calcium, magnesium, etc., or when the aluminosilicate is converted to the hydrogen form (by ion-exchanging the sodium cations with ammonium cations followed by thermal treatment to dissociate the ammonium ions), the resulting faujasite has enhanced catalytic activity especially for those reactions involving the so-called carbonium ion mechanism. These faujasite catalysts may be finished by incorporating an active catalytic metal into the catalyst composite by techniques such as ion-exchange, impregnation, etc. Thus, a nickel, palladium or platinum on faujasite catalyst makes an effective hydrocracking catalyst. Likewise, the faujasite may be incorporated into a refractory oxide matrix to form an effective catalytic cracking catalyst.

In tests run to illustrate the process of this invention, the following procedures were generally used. Silica spheres of approximately 1/16″ diameter having an apparent bulk density of from about 0.37 to about 0.40 were loaded into an autoclave which was equipped with pressure and temperature control means. Aqueous solutions containing sodium aluminate and/or sodium hydroxide were slowly added to the spheres to prevent the heat of adsorption from causing sphere breakage or initiating sphere digestion or conversion. The spheres and the aqueous mixture were aged at ambient temperature and 50 p.s.i.g. for four hours before the temperature and pressure of the autoclave were increased to 305° F. and 100 p.s.i.g. respectively. After six hours at 305° F. and 100 p.s.i.g., the autoclave was then cooled to room temperature and depressurized whereupon the solids were separated from the spent solution., the solids were water washed, dried at 260° F. and then analyzed by X-ray diffraction techniques.

EXAMPLE I

In this example, silica spheres were placed in the autoclave and contacted with an aqueous sodium aluminate solution resulting in a $SiO_2/Al_2O_3$ mol ratio of about 6. A quantity of a sodium hydroxide solution was added to give a $Na_2O/SiO_2$ mol ratio of about 0.60 and a $H_2O/Na_2O$ mol ratio of about 35. The solid-liquid was aged at room temperature and 50 p.s.i.g. for four hours. The autoclave was heated to 305° F. and maintained at 100 p.s.i.g. for six hours.

About 25% of the silica spheres were found to be amorphous with the remaining silica spheres being converted to type "A" zeolite, hydroxysodalite and a small quantity of faujasite.

EXAMPLE II

This example was the same as Example I except that the sodium aluminate solution after contacting the spheres for about two hours was drained and the remaining sodium hydroxide solution was added to the liquor and repressured into the autoclave. The aging period was continued for two more hours. The autoclave was then heated to 305° F. at 100 p.s.i.g. for four hours.

The silica spheres were converted to about 100% crystalline material which was unidentifiable by X-ray diffraction analyses.

EXAMPLE III

In this example, the silica spheres were mixed with an aqueous solution containing sodium aluminate, sodium hydroxide and sodium silicate with the $SiO_2/Al_2O_3$, $Na_2O/SiO_2$ and $H_2O/Na_2O$ mol ratios the same as in Example I. The sodium silicate was added to the aqueous mixture to initiate faujasite formation and represented less than about 20 mol percent of the total $SiO_2$. After aging and the high temperature high pressure conversion steps were completed, the solid product was found to be about 93 wt. percent faujasite with the remaining product amorphous in nature.

Table I is a summary of the three above experiments.

TABLE I

| Exp. No. | Overall Mole Ratios of Reactants | | | Sodium silicate in aqueous phase | Cold soak, time at temp. | High temp. high pressure conversion, time at temp. and pressure | Product Description |
| --- | --- | --- | --- | --- | --- | --- | --- |
| | $SiO_2/Al_2O_3$ | $Na_2O/SiO_2$ | $H_2O/Na_2O$ | | | | |
| I | 6 | 0.6 | 35 | No | 4 hrs. at 70° F | 6 hrs. at 305° F. and 100 p.s.i.g | Amorphous material 25%, remaining was type "A" zeolite with a trace of faujasite. |
| II | 6 | 0.6 | 35 | No | do | do | Unidentifiable crystalline material. |
| III | 6 | 0.6 | 35 | Yes [1] | do | do | 93% faujasite, 7% amorphous material. |

[1] Mol ratio of $SiO_2$ as aqueous sodium silicate to solid silica particles was less than about 0.2.

By adding a small quantity of sodium silicate to the aqueous solution in contact with the solid silica and allowing the solid silica to be converted to faujasite at the high temperature high pressure conditions, the time for faujasite production is greatly reduced. An analysis of the spent solutions shows a reduced concentration of silicon and aluminum compounds which can significantly reduce faujasite production costs.

The process is carried out using solid silica particles having particle diameters in the range of from about 0.02 micron to about 1/16 inch and incorporating a molar ratio of aqueous silica (sodium silicate as $Na_2O \cdot 3.2\ SiO_2$) to solid silica spheres of less than about 0.2. The reactants are cold soaked for periods of time of less than about 5 hours and preferably from about 3.5 to about 4.5 hours.

It is preferable that temperatures within the range of from about 260° F. to about 450° F. be employed for at least a portion of the high temperature high pressure crystallization. More preferably, temperatures of from 265° F. to 325° F. should be employed. Pressures up to any practical limitation are suitable employed although said pressures need not greatly exceed the vapor pressure of the solution. Suitable pressures are from about 25 p.s.i.g. up to about 300 p.s.i.g. It has been found that if the temperatures are maintained too high, crystallization proceeds very rapidly and it becomes difficult to control the desired type of crystalline aluminosilicate that forms.

The reactants are combined in the following molar ratios:

$SiO_2/Al_2O_3 = 6 \pm 3$
$Na_2O/SiO_2 = 0.6 \pm 0.3$
$H_2O/Na_2O = 45 \pm 20$.

The preferable molar ratio combinations are:

$SiO_2/Al_2O_3$ about $6 \pm 1$
$Na_2O/SiO_2$ about $0.5 \pm 0.1$
$Na_2O/H_2O$ about $45 \pm 10$
Solid $SiO_2/Na_2O \cdot 3.2SiO_2$ about $1.0 \pm 0.2$

DESCRIPTION OF PREFERRED EMBODIMENTS

A broad embodiment of this invention is found in a process for the production of faujasite employing solid silica particles as the major silica source and contacting the solid silica particles with an aqueous solution comprising sodium aluminate and sodium silicate, aging the resultant solid-liquid mixture and then subjectng the solid-liquid mixture to a high pressure high temperature crystallization step.

I claim as my invention:

1. In a method for the manufacture of a crystalline aluminosilicate faujasite wherein solid silica particles are intimately contacted with an aqueous solution comprising sodium aluminate and sodium hydroxide to form a solid-liquid mixture, the improvement which comprises adding to said solid-liquid mixture a portion of an aqueous sodium silicate solution, aging the resultant solid-liquid mixture containing sodium silicate at ambient temperature and then heating the mixture to a temperature between about 260° F. and about 450° F. at superatmospheric pressure to effect conversion of the solid silica particles to crystalline aluminosilicate faujasite.

2. The method of claim 1 further characterized in that the mole ratio of solid silica to sodium aluminate expressed as $SiO_2/Al_2O_3$ is greater than about 5; the mole ratio of sodium to total silica expressed as $Na_2O/SiO_2$ is greater than about 0.4; the mole ratio of water to sodium expressed as $H_2O/Na_2O$ is greater than about 35; and the mole ratio of solid silica to sodium silicate expressed as $SiO_2/Na_2O \cdot 3.2SiO_2$ is greater than about 0.8.

3. The process of claim 2 further characterized in that said solid liquid mixture is aged at ambient temperature for a period of time of less than about six hours and that the solid-liquid mixture is heated to a temperature included within the range of from about 265° F. to about 325° F. and at superatmospheric pressure for a period of time of from about five to about eight hours.

4. A process for the production of crystalline aluminosilicate faujasite using solid silica particles and an aqueous solution mixture comprising sodium aluminate as the starting materials, which process comprises:

(a) contacting said solid silica particles with an aqueous solution containing sodium aluminate and sodium silicate, the overall mole ratio of solid silica to sodium aluminate expressed as $SiO_2/Al_2O_3$ being about $6\pm1$; the mole ratio of solid silica to aqueous sodium silicate expressed as $SiO_2/Na_2O \cdot 3.2SiO_2$ being about $1.0\pm0.2$; and with water and sodium hydroxide additions maintaining a mole ratio of sodium to silica expressed as $Na_2O/SiO_2$ of about $0.5\pm0.1$ and a mole ratio of water to sodium expressed as $H_2O/Na_2O$ of about $45\pm10$;

(b) maintining the solid silica and aqueous solution mixture at ambient temperature for less than about six hours;

(c) heating the solid silica and aqueous solution mixture to an elevated temperature of from about 265° F. to about 325° F. while maintaining the mixture at a superatmospheric pressure sufficiently high to maintain the solution in liquid phase;

(d) maintaining the mixture at said elevated temperature and superatmospheric pressure for a period of time greater than about five hours to effect the conversion of substantially all said solid silica to crystallize aluminosilicate faujasite; and (e) separating said faujasite from the remaining aqueous solution and recovering a crystalline aluminosilicate faujasite.

5. The process of claim 4 further characterized in that the solid silica and aqueous solution mixture is maintained at ambient temperature for a period of time of from about 3.5 to about 4.5 hours.

6. The process of claim 5 further characterized in that the mixture is maintained at an elevated temperature included within the range of from about 295° F. to about 315° F.

7. The process of claim 6 further characterized in that the mixture is maintained at an elevated temperature and superatmospheric pressure for a period of time of from about 5 to about 8 hours.

References Cited

UNITED STATES PATENTS

| | | | |
|---|---|---|---|
| 2,847,280 | 8/1958 | Estes | 23—113 |
| 2,882,244 | 4/1959 | Milton | 23—113 |
| 3,119,659 | 1/1964 | Taggart et al. | 23—112 |
| 3,130,007 | 4/1964 | Breck | 23—113 |
| 3,343,913 | 9/1967 | Robson | 23—113 |
| 3,359,068 | 12/1967 | Michalko | 23—112 |
| 3,428,574 | 2/1969 | Michalko | 23—112 X |

EDWARD J. MEROS, Primary Examiner

U.S. Cl. X.R.

23—113